(12) United States Patent
Oike

(10) Patent No.: US 7,889,247 B2
(45) Date of Patent: Feb. 15, 2011

(54) SOLID-STATE IMAGING DEVICE, METHOD OF DRIVING SOLID-STATE IMAGING DEVICE, AND IMAGING APPARATUS

(75) Inventor: Yusuke Oike, Kanagawa (JP)

(73) Assignee: Sony Corporation, Tokyo (JP)

( * ) Notice: Subject to any disclaimer, the term of this patent is extended or adjusted under 35 U.S.C. 154(b) by 639 days.

(21) Appl. No.: 11/551,037

(22) Filed: Oct. 19, 2006

(65) Prior Publication Data
US 2007/0091191 A1 Apr. 26, 2007

(30) Foreign Application Priority Data
Oct. 24, 2005 (JP) ............................ P2005-307983

(51) Int. Cl.
 *H04N 5/217* (2006.01)
 *H04N 3/14* (2006.01)
 *H04N 3/17* (2006.01)
(52) U.S. Cl. ........................ 348/241; 348/294; 348/301
(58) Field of Classification Search ........................ None
See application file for complete search history.

(56) References Cited

U.S. PATENT DOCUMENTS

| 7,224,388 B2 * | 5/2007 | Takayanagi ................. 348/297 |
| 2003/0025816 A1 * | 2/2003 | Sakuragi ..................... 348/301 |
| 2005/0116264 A1 * | 6/2005 | Watanabe ................... 257/258 |
| 2006/0077273 A1 * | 4/2006 | Lee et al. ..................... 348/308 |

* cited by examiner

*Primary Examiner*—Lin Ye
*Assistant Examiner*—Euel K Cowan
(74) *Attorney, Agent, or Firm*—SNR Denton US LLP

(57) ABSTRACT

A solid-state imaging device includes: a pixel array unit including unit pixels arranged in a matrix, each of the unit pixels having a photoelectric conversion element that converts a light signal to a signal charge, an amplifying transistor that amplifies and outputs the signal charge as a signal voltage, and a capacitive element whose one end is connected to a control electrode of the amplifying transistor; a driving means for selectively supplying a predetermined voltage to the other end of the capacitive element; and a signal processing circuit that performs a predetermined signal processing with respect to a signal output from each pixel of the pixel array unit.

13 Claims, 16 Drawing Sheets

SOLID-STATE IMAGING DEVICE, METHOD OF DRIVING SOLID-STATE IMAGING DEVICE, AND IMAGING APPARATUS

CROSS REFERENCES TO RELATED APPLICATIONS

The present invention contains subject matter related to Japanese Patent Application JP 2005-307983 filed in the Japanese Patent Office on Oct. 24, 2005, the entire contents of which being incorporated herein by reference.

BACKGROUND OF THE INVENTION

1. Field of the Invention

The present invention relates to a solid-state imaging device, a method of driving a solid-state imaging device, and an imaging apparatus.

2. Description of the Related Art

In recent years, an amplification-type image sensor is known as a solid-state imaging device suitable for application to an imaging apparatus, such as a video camera or a digital still camera. The amplification-type image sensor has a structure in which, in each pixel cell (unit pixel), a signal obtained by photoelectric conversion is amplified by a MOS transistor (amplifying transistor) and is then output.

In such an image sensor, a technique of suppressing noise components generated due to various factors is needed to obtain high-definition images. With development of a technique of suppressing noise components generated due to thermal noise or variation of an element, it is possible to suppress the noise components generated due to the thermal noise or the variation of an element. However, it is still difficult to suppress 1/f noise of an amplifying transistor from occurring. In recent years, particularly the 1/f noise is becoming a dominant noise component of an output signal. Accordingly, in a future image sensor with high sensitivity, it is important to suppress the 1/f noise of an amplifying transistor.

In the related art, in order to reduce the 1/f noise of a MOSFET, there has been reported a method in which an operation of sweeping out electrons/holes trapped in a channel by causing a transistor to be in an OFF state or a deep accumulation state is repeatedly performed (for example, refer to IEEE Journal of Solid-State Circuits, vol. 35, no. 7, JULY 2000 "Reducing MOSFET 1/f Noise and Power Consumption by Switched Biasing").

A principle of reducing the 1/f noise will now be described.

When a transistor is biased by a predetermined voltage Vbias, a current flowing into a main electrode of the transistor has a value corresponding to a sum of a predetermined current Ib and a noise current inoise. In general, a current noise of a transistor varies depending on a frequency, as shown in FIG. 23. For example, the thermal noise, which is a typical noise, is distributed over a wide band, and a 1/f noise is dominant in a low-frequency band of 1 MHz or less.

In the related art disclosed in IEEE Journal of Solid-State Circuits, vol. 35, no. 7, JULY 2000 "Reducing MOSFET 1/f Noise and Power Consumption by Switched Biasing", it is possible to periodically sweep out electrons/holes trapped in the channel by performing a pulse operation of causing a transistor to be in an OFF state or a deep accumulation state. As a result, 1/f noise components lower than a pulse frequency can be reduced.

FIG. 24 illustrates the frequency spectrum of relative noise power of 1/f noise in a case of applying a pulse signal with a frequency of 10 kHz and a duty cycle of 50%. In FIG. 24, there are shown noise power spectrum in a case in which a constant bias voltage is supplied, noise power spectrum in a case in which a pulse having an amplitude from a bias voltage to a threshold voltage VT is supplied, and noise power spectrum in a case in which a pulse having an amplitude from a bias voltage to a voltage of 0 V is supplied. It can be seen that an effect of reducing the 1/f noise is achieved in a range of 10 kHz or less.

The principle of reducing the 1/f noise described above is applied to reduce the 1/f noise of a pixel transistor in a CMOS image sensor (for example, refer to JP-A-2003-32554).

FIG. 25 is a circuit diagram illustrating the basic configuration in a related art disclosed in JP-A-2003-32554. In the related art disclosed in JP-A-2003-32554, a CMOS image sensor 100 includes unit pixels 200, which are arranged in a matrix and in a two-dimensional manner and each of which has a photodiode 201, a transfer transistor 202, a reset transistor 203, an amplifying transistor 204, and a selection transistor 205. In addition, the CMOS image sensor 100 has a configuration in which switches 102-1 to 102-m are respectively added to vertical signal lines 101-1 to 101-m, such that a voltage supplied through a terminal 103 is applied to each of the vertical signal lines 101-1 to 101-m when each of the switches 102-1 to 102-m is in an ON state.

At this time, the applied voltage is a voltage close to a power supply voltage. In addition, by using the applied voltage, it is possible to cause the amplifying transistor 204 within the pixel 200 to be in an OFF state or a deep accumulation state. In this case, the voltage is applied to a main electrode (source electrode) of the amplifying transistor 204 through the selection transistor 205.

SUMMARY OF THE INVENTION

However, in the related art disclosed in JP-A-2003-32554, when changing the amplifying transistor 201 to an OFF state or a deep accumulation state, a pulse signal is applied to all vertical signal lines 101-1 to 101-m for one line access. For this reason, parasitic capacitance of all of the vertical signal lines and parasitic capacitance of all of the selection transistors 202 or the amplifying transistors 201 connected to all of the vertical signal lines should be charged or discharged. As a result, a problem occurs in that power consumption increases and it is difficult to increase the speed of a reading operation. In addition, if the number of pixels increases in order to increase the resolution, the load capacitance also increases corresponding to the increased number of pixels. As a result, a problem occurs where it is also difficult to increase the resolution.

Moreover, since a voltage is forced to be applied to the vertical signal line 101 (101-1 to 101-m) in order to cause the amplifying transistor 201 to be in an OFF state or a deep accumulation state, a current leaks from a constant current source or a biased load MOS transistor or amplifying transistor provided instead of the constant current source, which is connected to the vertical signal line 101. As a result, a problem occurs where the power consumption increases.

Furthermore, since a voltage of a main electrode of the amplifying transistor 201 is controlled through the selection transistor 202, the main electrode of the amplifying transistor 201 cannot be driven up to a power supply voltage if the selection transistor 202 is not driven with a voltage that is higher than the power supply voltage as much as a threshold value. As a result, the amplifying transistor 201 is not in a complete OFF state, which causes a problem in that an effect of reducing the 1/f noise is reduced.

Therefore, it is desirable to provide a solid-state imaging device capable of suppressing power consumption and reducing 1/f noise, a method of driving the solid-state imaging device, and an imaging apparatus.

According to an embodiment of the invention, there is provided a solid-state imaging device having a configuration in which unit pixels are arranged in a matrix and each of the unit pixels has a photoelectric conversion element that converts a light signal to a signal charge and an amplifying transistor that amplifies and outputs the signal charge as a signal voltage. In addition, a capacitive element whose one end is connected to a control electrode of the amplifying transistor is provided within the unit pixel, and the amplifying transistor is in an OFF state or a deep accumulation state by selectively supplying a predetermined voltage to the other end of the capacitive element.

As used herein, an "end" of a capacitor or capacitive element means a side of a capacitor or capacitive element.

In the solid-state imaging device having the configuration described above, by supplying the predetermined voltage to the other end of the capacitive element provided within the unit pixel, it is possible to make an electric potential of a floating diffusion section close to or less than a threshold voltage of the amplifying transistor while holding signal charges, which have been read out from the photoelectric conversion element and are then held in the floating diffusion section so that the amplifying transistor becomes an OFF state or a deep accumulation state. As a result, it is possible to sweep out electrons/holes trapped in a channel of the amplifying transistor. In particular, when reading out a predetermined row, the predetermined voltage is supplied to only a corresponding row. Accordingly, in the case of a two-dimensional arrangement where pixels are arrayed in an n (row)×m (column) matrix, there is a load corresponding to m pixels located at the corresponding row, as compared with the related art in which there is a load corresponding to n×m pixels. As a result, it is possible to reduce the load when supplying a predetermined voltage.

According to the embodiment of the invention, since it is possible to reduce the load when causing the amplifying transistor to be in an OFF state or a deep accumulation state, it is possible to reduce the 1/f noise while suppressing the power consumption.

DESCRIPTION OF THE PREFERRED EMBODIMENTS

Hereinafter, embodiments of the invention will be described in detail with reference to the accompanying drawings.

First Embodiment

Figure 1:
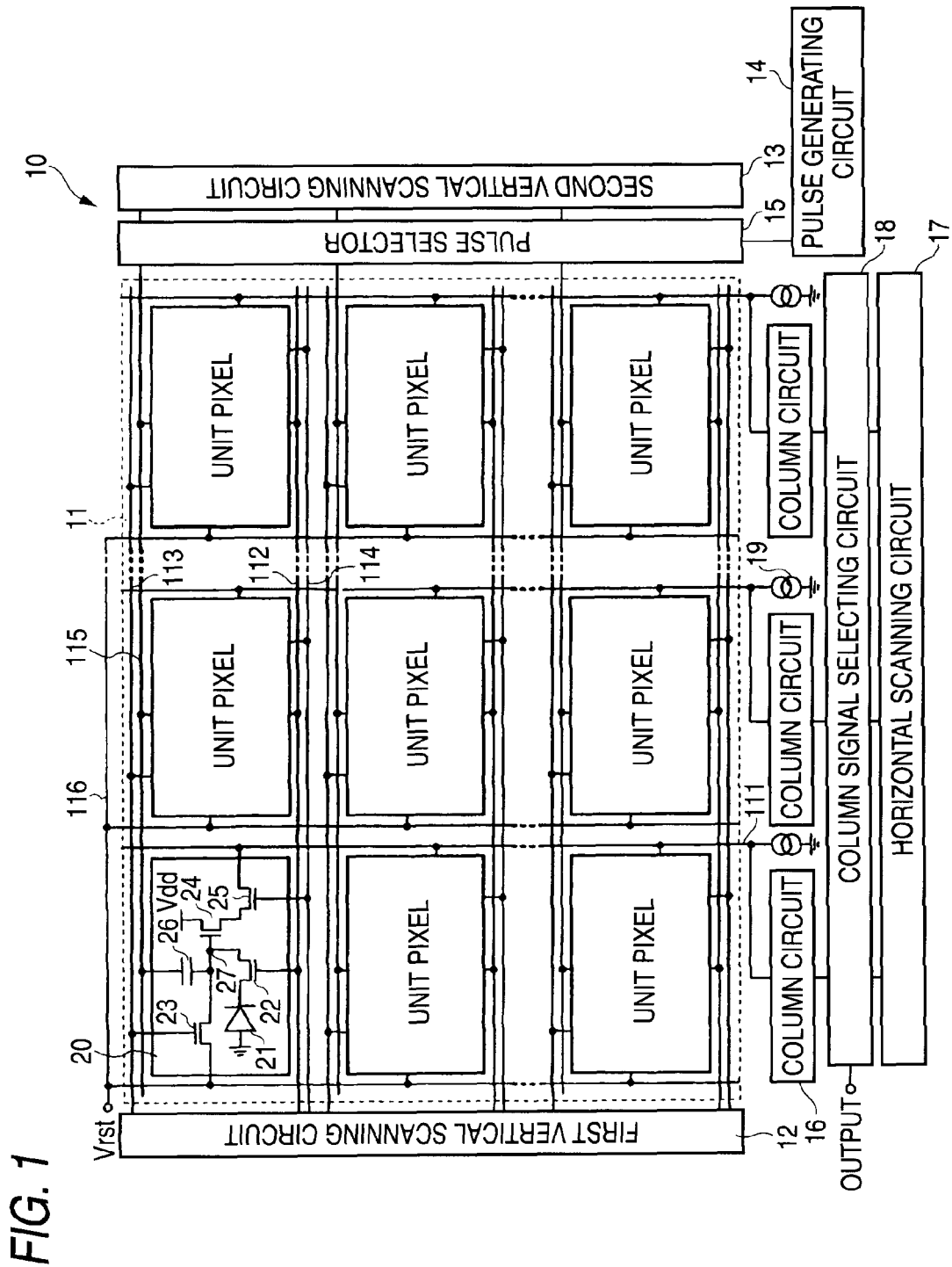
FIG. 1 is a system configuration view illustrating the configuration of a CMOS image sensor according to a first embodiment of the invention.

FIG. 1 is a system configuration view illustrating the configuration of a solid-state imaging device, for example, a CMOS image sensor according to a first embodiment of the invention.

As shown in FIG. 1, a CMOS image sensor 10 according to the present embodiment is configured to include a pixel array unit 11, in which unit pixels (hereinafter, a unit pixel may be simply referred to as a 'pixel') 20 each having a photoelectric conversion element are arranged in a matrix and in a two-dimensional manner, a first vertical scanning circuit 12, a second vertical scanning circuit 13, a pulse generating circuit 14, a pulse selector 15, a plurality of column circuits 16, a horizontal scanning circuit 17, and a column signal selecting circuit 18, which are peripheral circuits of the pixel array unit 11.

In the matrix arrangement of the pixels 20 of the pixel array unit 11, a vertical signal line 111 is wired for each column and driving control lines, such as a transfer control line 112, a reset control line 113, and a selection control line 114, and a pulse supply line 115 are wired for each row. In addition, a reset line 116 through which a reset voltage Vrst is supplied is wired to each of the unit pixels 20.

First Circuit Example of a Unit Pixel

Figure 2:
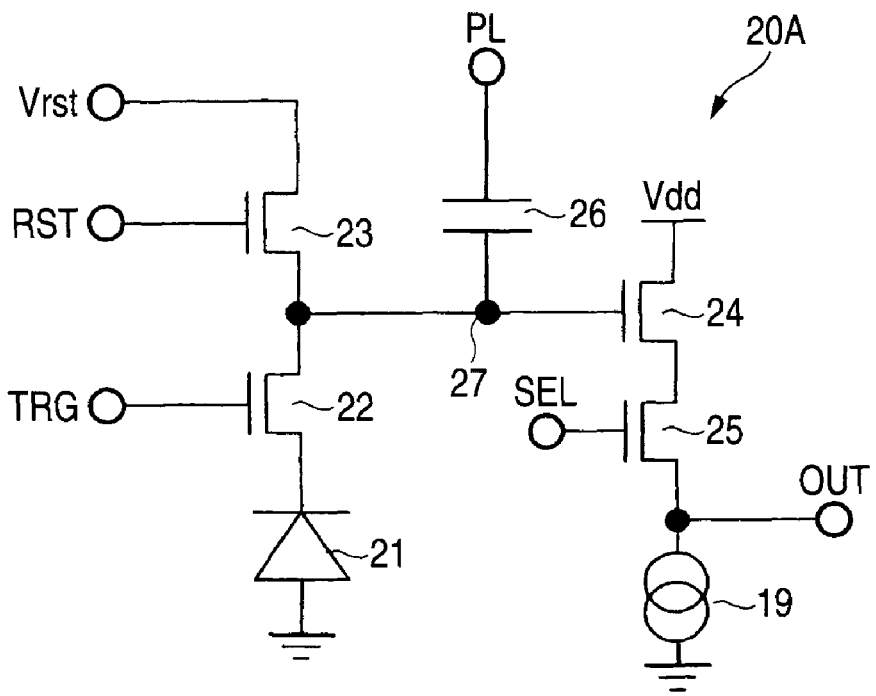
FIG. 2 is a circuit diagram illustrating the circuit configuration of a unit pixel in a first circuit example.

FIG. 2 is a circuit diagram illustrating the circuit configuration of a unit pixel 20A in a first circuit example. As shown in FIG. 2, the unit pixel 20A in the first circuit example is configured as a pixel circuit including a photoelectric conversion element, such as a photodiode 21, and four transistors of a transfer transistor 22, a reset transistor 23, an amplifying transistor 24, and a selection transistor 25, and a capacitive element 26. Here, for example, an N-channel MOS transistor is used as each of the transistors 22 to 25.

The transfer transistor 22 is connected between a cathode electrode of the photodiode 21 and an FD section (floating diffusion section) 27 serving as a charge voltage conversion section. In addition, the transfer transistor 22 transfers signal charges (here, electrons), which have been photoelectrically converted by the photodiode 21 and are stored in the photodiode 21, to the FD section 27 by applying a transfer pulse TRG to a gate electrode of the transfer transistor 22.

The reset transistor 23 has a drain electrode connected to the reset line 116 and a source electrode connected to the FD section 27 and serves to reset the electric potential of the FD section 27 to a reset voltage Vrst by applying a reset pulse RST to the gate electrode before the signal charges are transferred from the photodiode 21 to the FD section 27.

The amplifying transistor 24 has a gate electrode (control electrode) connected to the FD section 27 and a drain electrode connected to a pixel power supply Vdd, outputs as a reset level the electric potential of the FD section 27 after being reset by the reset transistor 23, and outputs as a signal level the electric potential of the FD section 27 after the signal charges are transferred by the transfer transistor 22.

In the selection transistor 25, for example, a drain electrode is connected to a source electrode of the amplifying transistor 24 and a source electrode is connected to the vertical signal line 111. In addition, when a selection pulse SEL is applied to the gate electrode of the selection transistor 25, the selection transistor 25 is turned on, causing the pixel 20A to be in a selection state. As a result, a signal output from the amplifying transistor 24 is output to the vertical signal line 111.

In addition, it may be possible to adopt a configuration in which the selection transistor 25 is connected between the pixel power supply Vdd and the drain electrode of the amplifying transistor 24.

The capacitive element 26 has one end, which is connected to the gate electrode (FD section 27) of the amplifying transistor 24, and the other end connected to the pulse supply line 115 through which pulses are supplied. To the other end of the capacitive element 26, a pulse signal PL which is active at a low level (for example, a ground level) is applied through the pulse supply line 115 at a proper timing. As the capacitive element 26, the parasitic capacitance added to the gate electrode of the amplifying transistor 24 or a capacitor intentionally provided within the pixel 20A may be used.

Referring back to FIG. 1, the first vertical scanning circuit 12 is configured to have a shift register, an address decoder, and the like, and scans the respective pixels 20 of the pixel array unit 11 in a row unit of an electronic shutter row and a read row and in a vertical direction (up and down direction) by appropriately generating the reset pulse RST, the transfer pulse TRG, the selection pulse SEL, or the like. At this time, for the electronic shutter row, an electronic shutter operation of sweeping out a signal of the pixel 20 located at the corresponding row is performed, and for the read row, a reading operation of reading out a signal of the pixel 20 located at the corresponding row is performed.

Although not shown in the drawing, the first vertical scanning circuit 12 is configured to include a read scanning system and an electronic shutter scanning system. Here, the read scanning system performs a reading operation of reading out a signal of each of the pixels 20 located at the read row while sequentially selecting the pixels 20 in a unit of a row, and the electronic shutter scanning system performs an electronic shutter operation on the same row (electronic shutter row) a period of time corresponding to the shutter speed before performing the read scanning operation by means of the read scanning system.

In addition, a period of time from timing, at which unnecessary electric charges of the photodiode 21 are reset by the shutter scanning operation performed by the electronic shutter scanning system, to timing, at which signals of the pixel 20 are read out by the read scanning operation performed by the read scanning system, is a storage period of time (exposure period of time) while signal charges are accumulated in the pixel 20. That is, the electronic shutter operation refers to an operation of resetting (sweeping out) the signal charges accumulated in the photodiode 21 and then newly starting accumulation of signal charges after the reset operation.

The second vertical scanning circuit 13 is configured to have a shift register, an address decoder, and the like, in the same manner as the first vertical scanning circuit 12, and selects a row, to which the pulse signal PL applied to the other end of the capacitive element 26 is supplied, by performing a vertical scanning operation in synchronization with the first vertical scanning circuit 12. The pulse generating circuit 14 generates the pulse signal PL applied to the other end of the capacitive element 26.

The pulse selector 15 supplies the pulse signal PL, which has been generated by the pulse generating circuit 14, to the row selected by the second vertical scanning circuit 13. That is, each of the second vertical scanning circuit 13, the pulse generating circuit 14, and the pulse selector 15 corresponds to a driving unit according to any one of the embodiments of the invention, and selectively supplies a predetermined voltage, for example, the low-level pulse signal PL to the other end of the capacitive element 26.

The column circuit 16 is disposed, for example, for each column of pixels of the pixel array unit 11. That is, the column circuit 16 is disposed to correspond to the column of pixels one to one. In addition, the column circuit 16 performs a predetermined signal processing with respect to signals output from each pixel 20, which is located at a read row selected by the vertical scanning operation performed by the first vertical scanning circuit 12, through the vertical signal line 111 and temporarily holds pixel signals after the signal processing. That is, the column circuit 16 corresponds to a signal processing circuit according to any one of the embodiments of the invention. A specific circuit example of the column circuit 16 will be described later.

The horizontal scanning circuit 17 is configured to have a shift register, an address decoder, and the like, and vertically scans the column circuits 16, each of which is disposed for each column of pixels of the pixel array unit 11, in a sequential manner. The column signal selecting circuit 18 is configured to have a horizontal selection switch, a horizontal signal line, and the like, and sequentially outputs the pixel signals, which are temporarily held in the column circuit 16, in synchronization with the horizontal scanning operation performed by the horizontal scanning circuit 17.

In addition, a constant current source 19 is connected to one end of each vertical signal line 111. It maybe possible to use, for example, a biased transistor instead of the constant current source 19. Moreover, a timing signal or a control signal, which is used as a reference signal for operations of the first vertical scanning circuit 12, the second vertical scanning circuit 13, the pulse generating circuit 14, the column circuit 16, and the horizontal scanning circuit 17, is generated by a timing control circuit (not shown).

In the CMOS image sensor 10 having the above-described configuration according to the first embodiment of the invention, one end of the capacitive element 26 is connected to the gate electrode of the amplifying transistor 24 of the unit pixel 20 and a predetermined voltage, specifically, the pulse signal PL which is active at a low level (for example, a ground level) is applied to the other end of the capacitive element 26.

Next, a first circuit operation of the unit pixel 20A in the CMOS image sensor 10 according to the present embodiment will be described with reference to a timing chart shown in FIG. 3.

Figure 3:
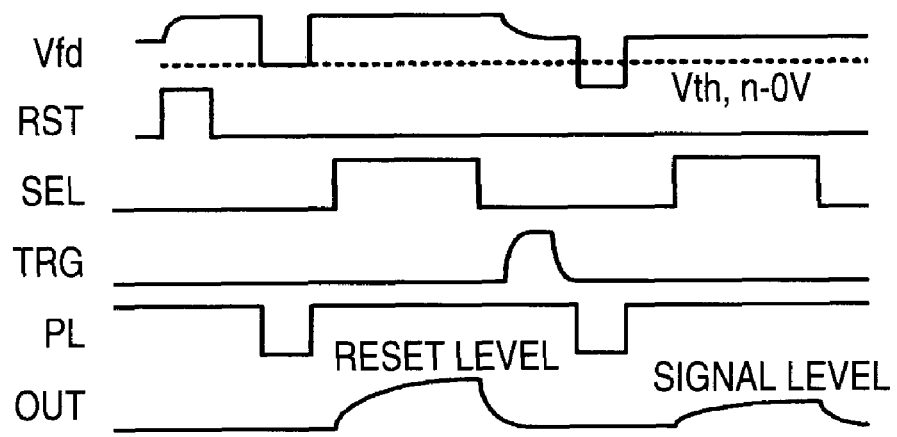
FIG. 3 is a timing chart used to explain a first circuit operation of the unit pixel in the first circuit example.

FIG. 3 is a timing chart used to explain the first circuit operation of the unit pixel 20A. In FIG. 3, timing relationships among an electric potential Vfd of the FD section 27, the reset pulse RST, the selection pulse SEL, the transfer pulse TRG, the pulse signal PL, and an output signal OUT of the unit pixel 20A and signal waveforms thereof are shown.

As is apparent from the timing chart shown in FIG. 3, in the circuit operation of the unit pixel 20A, first, the reset pulse RST becomes active (changes to a high level), thereby resetting the FD section 27. Then, the pulse signal PL becomes active (changes to a low level), which causes the electric potential of the FD section 27 to be close to or less than a threshold voltage of the amplifying transistor 24. As a result, the amplifying transistor 24 changes to an OFF state or a deep accumulation state.

Since the amplifying transistor 24 is in the OFF state or the deep accumulation state, electrons/holes trapped in the channel of the amplifying transistor 24 can be swept out. Then, by changing the selection pulse SEL to an active state (high level), it is possible to reduce 1/f noise of the amplifying transistor 24 at the time of outputting the electric potential Vfd of the FD section 27 as a reset level. In order to reduce the 1/f noise more effectively, it is preferable to change the amplifying transistor 24 to the OFF state.

Thereafter, the transfer pulse TRG becomes active (changes to a high level), and consequently, signal charges accumulated in the photodiode 21 are transferred to the FD section 27. Then, the pulse signal PL becomes active, and consequently, an electric potential of the gate electrode of the amplifying transistor 24 becomes equal to or smaller than the threshold voltage of the amplifying transistor 24 under a state in which the signal charges accumulated in the FD section 27 are held. As a result, the amplifying transistor 24 changes to an OFF state or a deep accumulation state.

By changing the amplifying transistor 24 to the OFF state or the deep accumulation state, the electrons/holes trapped in the channel of the amplifying transistor 24 can be swept out in the same manner as in the reset operation described above. Subsequently, by changing the selection pulse SEL to an active state (high level), it is possible to reduce 1/f noise of the amplifying transistor 24 at the time of outputting the electric potential Vfd of the FD section 27 as a signal level.

As described above, since it is possible to make the electric potential of the FD section 27 close to or less than the threshold voltage of the amplifying transistor 24 while holding the signal charges held in the FD section 27 by connecting one end of the capacitive element 26 to the gate electrode of the amplifying transistor 24 and applying a predetermined voltage, specifically, the pulse signal PL which is active at a ground level, to the other end of the capacitive element 26, the amplifying transistor 24 changes to the OFF state or the deep accumulation state. As a result, the electrons/holes trapped in the channel of the amplifying transistor 24 can be swept out, which makes it possible to reduce 1/f noise of the amplifying transistor 24 at the time of reading out a reset level or a signal level.

Further, when reading out a predetermined row, the pulse signal PL is input to only a corresponding row. Accordingly, in the case of a two-dimensional arrangement where the pixels 20 are arranged in an n (row)×m (column) matrix, there is a load corresponding to m pixels located at a corresponding row, as compared with the related art in which there is a load corresponding to n×m pixels. As a result, it is possible to reduce the power consumption and increase the speed of a signal reading operation due to the load reduction because the load when applying the pulse signal PL can be reduced substantially. Furthermore, since it is possible to suppress the load from increasing as resolution (the number of pixels) increases, the method described above is a technique advantageous to, in particular, increasing the resolution.

Furthermore, by applying the pulse signal PL to the capacitive element 26 having high impedance, it is possible to change the amplifying transistor 24 to an OFF state or a deep accumulation state even if the vertical signal line 111 is not driven unlike in the related art. Accordingly, since it is possible to solve a problem where a current flows abnormally (leaks), the power consumption can be reduced.

Moreover, since the amplifying transistor 24 changes to the OFF state or the deep accumulation state without driving the vertical signal line 111, it is possible to speed up the read cycle time by inputting the pulse signal PL for a previous signal reading period of time. As a result, it is possible to increase the speed of the signal reading operation.

In addition, since the amplifying transistor 24 can be in a complete OFF state even if a voltage equal to or larger than the power supply voltage Vdd of the pixel 20 is not supplied, even a larger effect of reducing 1/f noise can be obtained.

Figure 4:
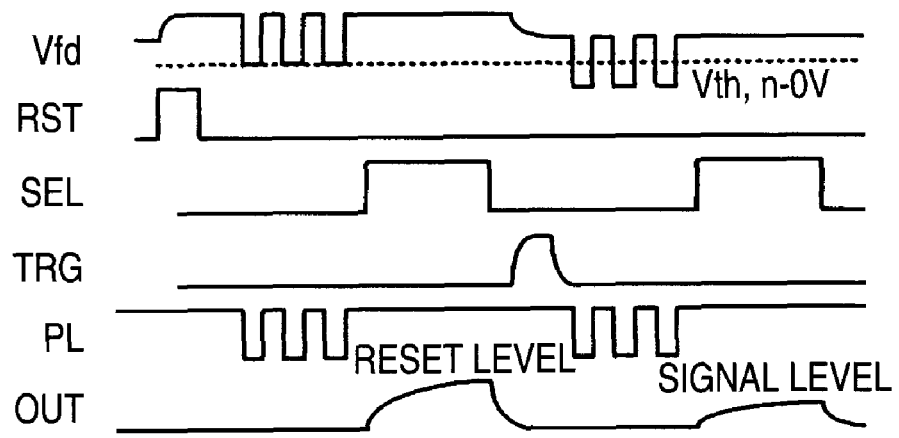
FIG. 4 is a timing chart used to explain a second circuit operation of the unit pixel in the first circuit example.

In addition, in the first circuit operation described above, the pulse signal PL is applied to the other end of the capacitive element 26 once at the time of each of the reset operation and the signal reading operation; however, as shown by a timing chart in FIG. 4, the pulse signal PL may be applied to the other end of the capacitive element 26 a plural number of times (in this example, three times) at the time of each of the reset operation and the signal reading operation (second circuit operation). By inputting the pulse signal PL a plural number of times in the same manner as the second circuit operation, it is possible to further enhance effects of sweeping out the electrons/holes trapped in the channel of the amplifying transistor 24.

FIG. 4 is a timing chart used to explain the second circuit operation of the unit pixel 20A. In FIG. 4, timing relationships among the electric potential Vfd of the FD section 27, the reset pulse RST, the selection pulse SEL, the transfer pulse TRG, the pulse signal PL, and the output signal OUT of the unit pixel 20A and signal waveforms thereof are shown.

Furthermore, in the embodiment described above, the case has been exemplified where the unit pixel 20A having four transistors, such as the transfer transistor 22, the reset transistor 23, the amplifying transistor 24, and the selection transistor 25, as pixel transistors. However, the invention is not limited to the application to the unit pixel 20A. Hereinafter, other circuit examples will be described.

Second Circuit Example of a Unit Pixel

Figure 5:
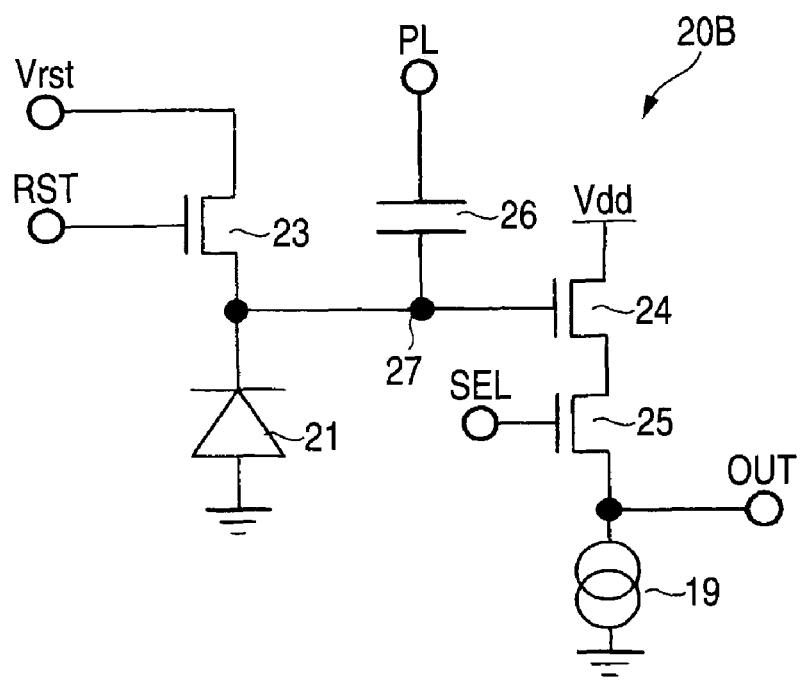
FIG. 5 is a circuit diagram illustrating the circuit configuration of a unit pixel in a second circuit example.

FIG. 5 is a circuit diagram illustrating the circuit configuration of a unit pixel 20B in the second circuit example. In FIG. 5, the same elements as in FIG. 2 are denoted by the same reference numerals.

As shown in FIG. 5, the unit pixel 20B in the second circuit example is configured as a pixel circuit including a photoelectric conversion element, such as a photodiode 21, and three transistors of a reset transistor 23, an amplifying transistor 24, and a selection transistor 25 and a capacitive element 26. That is, the unit pixel 20B in the second circuit example is configured not to include the transfer transistor 22 (refer to FIG. 2) of the unit pixel 20A in the first circuit example.

Figure 6:
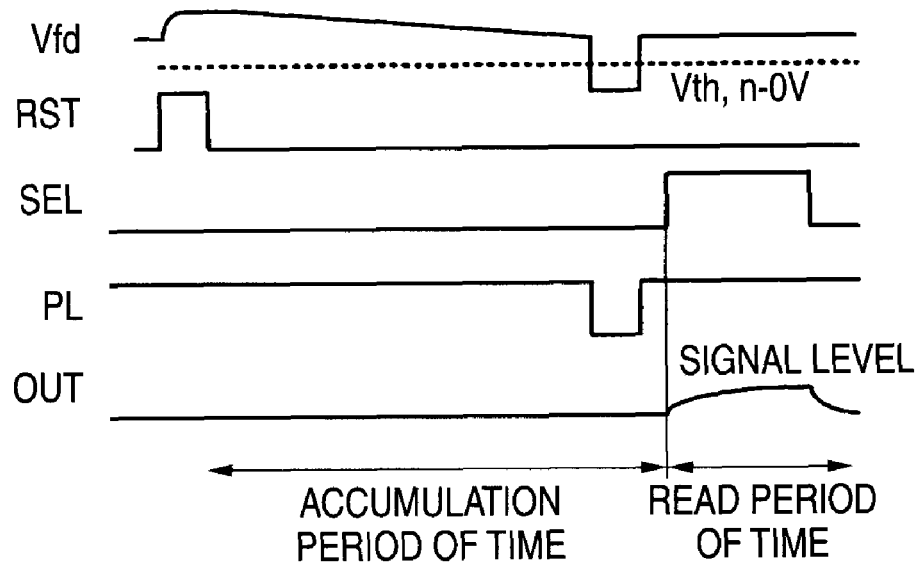
FIG. 6 is a timing chart used to explain a circuit operation of the unit pixel in the second circuit example.

FIG. 6 is a timing chart used to explain an operation of the unit pixel 20B. In FIG. 6, timing relationships among an electric potential Vfd of the FD section 27, a reset pulse RST, a selection pulse SEL, a pulse signal PL, and an output signal OUT of the unit pixel 20B and signal waveforms thereof are shown.

In the unit pixel 20B, a period of time from timing, at which the reset pulse RST becomes inactive (changes to a low level), to timing, at which the selection pulse SEL becomes active (changes to a high level), is a storage period of time (exposure period of time), and signal charges photoelectrically converted by the photodiode 21 are accumulated in the FD section 27 after the reset by the reset pulse RST.

Then, in the last half of the storage period time, the pulse signal PL becomes active. Thus, since the electric potential of the gate electrode of the amplifying transistor 24 becomes equal to or smaller than the threshold voltage of the amplifying transistor 24 under a state in which the signal charges accumulated in the FD section 27 are held, the amplifying transistor 24 changes to an OFF state or a deep accumulation state.

By changing the amplifying transistor 24 to the OFF state or the deep accumulation state, electrons/holes trapped in the channel of the amplifying transistor 24 can be swept out. Then, by changing the selection pulse SEL to an active state (high level), it is possible to reduce 1/f noise of the amplifying transistor 24 at the time of outputting the electric potential Vfd of the FD section 27 as a signal level.

Moreover, even in the unit pixel 20B in the second circuit example, in the same manner as in the second circuit operation of the unit pixel 20A in the first circuit example, it is possible to further enhance the effects of sweeping out the electrons/holes trapped in the channel of the amplifying transistor 24 by applying the pulse signal PL to the other end of the capacitive element 26 a plural number of times at the time of a signal reading operation.

Third Circuit Example of a Unit Pixel

Figure 7:
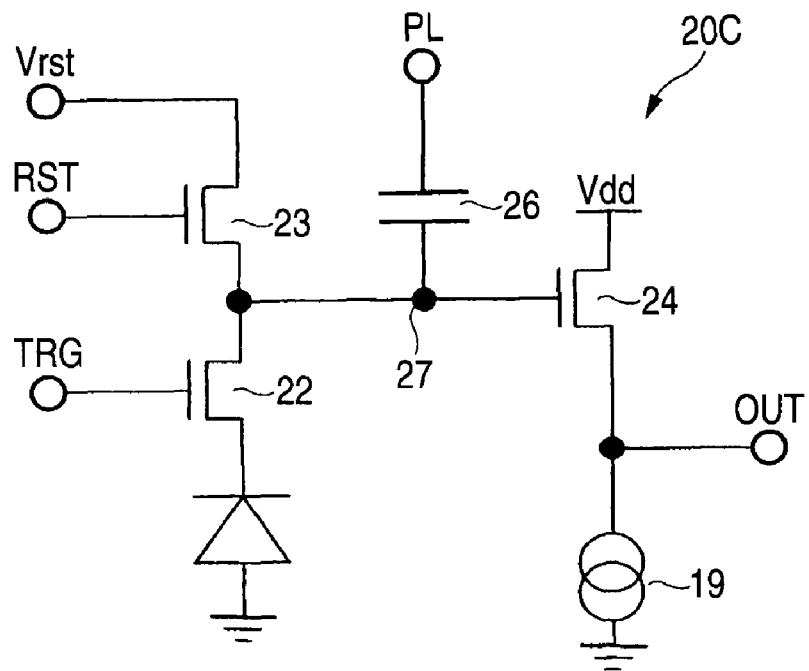
FIG. 7 is a circuit diagram illustrating the circuit configuration of a unit pixel in a third circuit example.

FIG. 7 is a circuit diagram illustrating the circuit configuration of a unit pixel 20C in a third circuit example. In FIG. 7, the same elements as in FIG. 2 are denoted by the same reference numerals.

As shown in FIG. 7, the unit pixel 20C in the third circuit example is configured as a pixel circuit including a photoelectric conversion element, such as a photodiode 21, and three transistors of a transfer transistor 22, a reset transistor 23, and an amplifying transistor 24 and a capacitive element 26. That is, the unit pixel 20C in the third circuit example is configured not to include the selection transistor 25 (refer to FIG. 2) of the unit pixel 20A in the first circuit example.

Figure 8:
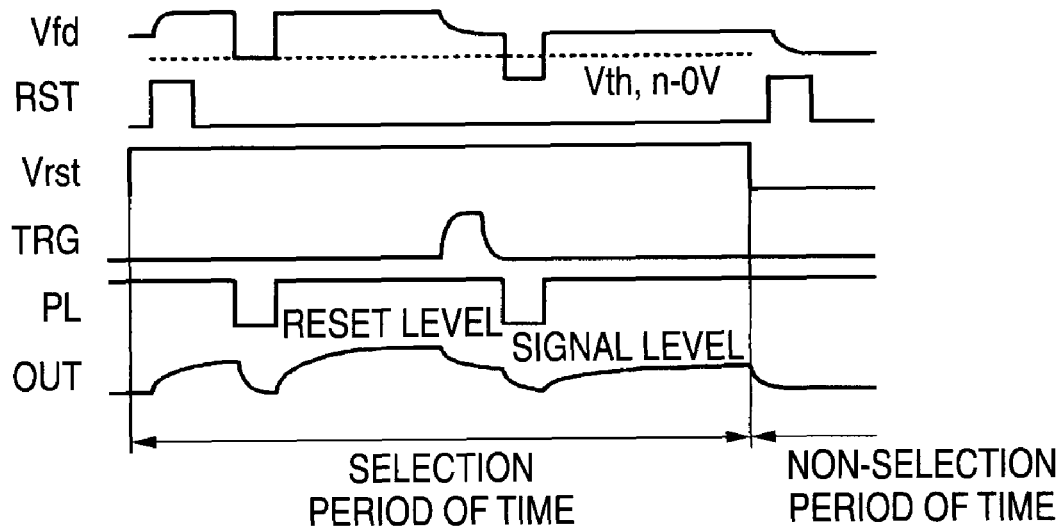
FIG. 8 is a timing chart used to explain a circuit operation of the unit pixel in the third circuit example.

FIG. 8 is a timing chart used to explain an operation of the unit pixel 20C. In FIG. 8, timing relationships among an electric potential Vfd of an FD section 27, a reset pulse RST, a reset voltage Vrst, a transfer pulse TRG, a pulse signal PL, and an output signal OUT of the unit pixel 20C and signal waveforms thereof are shown.

Referring to FIG. 8, in the unit pixel 20C in the third circuit example, a selection transistor for pixel selection is not provided, and accordingly, the reset voltage Vrst has two values. Thus, a period of time for which the reset voltage Vrst is in a high level, that is, the reset voltage Vrst is the reset voltage (for example, Vdd level) in the first circuit example is a selection period of time of the pixel 20C, and a period of time for which the reset voltage Vrst is in a low level (for example, a ground level) is a non-selection period of time of the pixel 20C.

In the unit pixel 20C, when the reset voltage Vrst is set as a high level and then the reset pulse RST becomes active (changes to a high level), a reset operation of the FD section 27 is performed. The electric potential of the FD section 27 after the reset operation has been performed is read out as a reset level. Thereafter, the transfer pulse TRG becomes active (changes to a high level), and consequently, signal charges accumulated in the photodiode 21 are transferred to the FD section 27 to be read out as a signal level.

After the selection period of time expires and thus the reset voltage Vrst transitions to a low level, the reset pulse RST becomes active again. As a result, since the amplifying transistor 24 is in an OFF state, the pixel 20C is in a non-selection state. Thus, a series of reading operations are completed.

Even in the unit pixel 20C in the third circuit example, by inputting the pulse signal PL to the other end of the capacitive element 26 once or a plural number of times after resetting the FD section 27 and transferring the signal charges, it is possible to cause the amplifying transistor 24 to be in an OFF state or a deep accumulation state immediately before reading out the reset level or the signal level. As a result, since it is possible to sweep out electrons/holes trapped in the channel of the amplifying transistor 24, it is possible to reduce 1/f noise of the amplifying transistor 24 at the time of reading out the reset level or the signal level.

Fourth Circuit Example of a Unit Pixel

Figure 9:
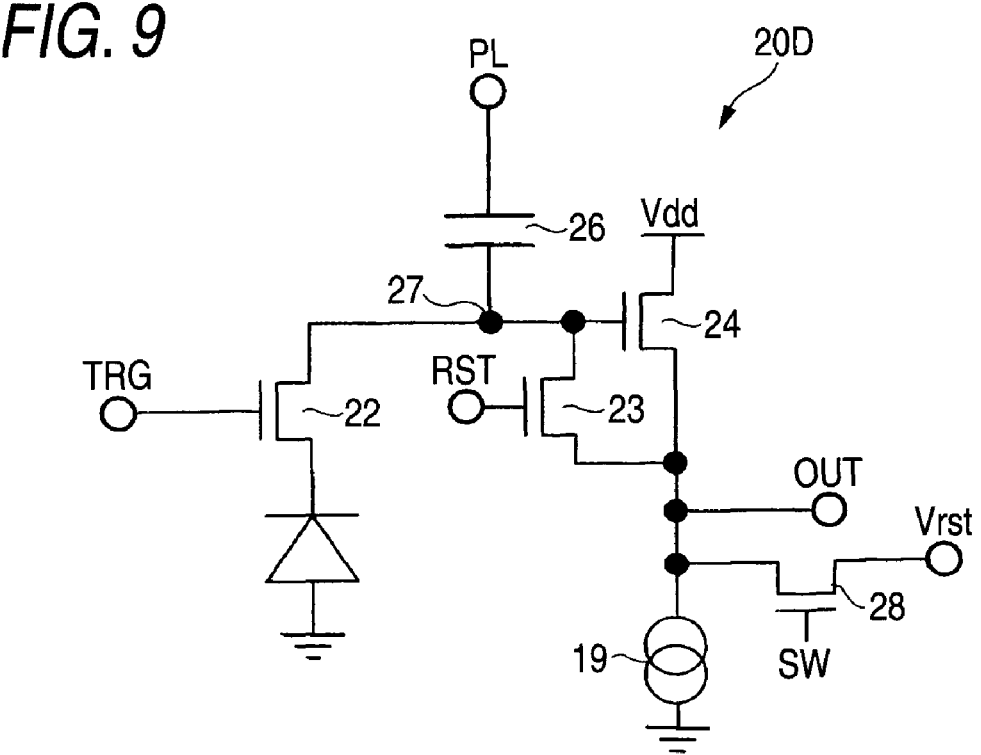
FIG. 9 is a circuit diagram illustrating the circuit configuration of a unit pixel in a fourth circuit example.

FIG. 9 is a circuit diagram illustrating the circuit configuration of a unit pixel 20D in a fourth circuit example. In FIG. 9, the same elements as in FIG. 2 are denoted by the same reference numerals.

As shown in FIG. 9, the unit pixel 20D in the fourth circuit example is configured as a pixel circuit including a photoelectric conversion element such as a photodiode 21, three transistors of a transfer transistor 22, a reset transistor 23, and an amplifying transistor 24, a capacitive element 26, and a switch transistor 28.

That is, the unit pixel 20D in the fourth circuit example does not have the selection transistor 25 (refer to FIG. 2) of the unit pixel 20A in the first circuit example and has a configuration in which a reset voltage Vrst is selectively supplied from the vertical signal line 111. Therefore, the reset transistor 23 is connected between the FD section 27 (a gate electrode of the amplifying transistor 24) and the vertical signal line 111, and the vertical signal line 111 is selectively supplied with the reset voltage Vrst through the switch transistor 28 which changes to an ON state by a switch pulse SW.

Figure 10:
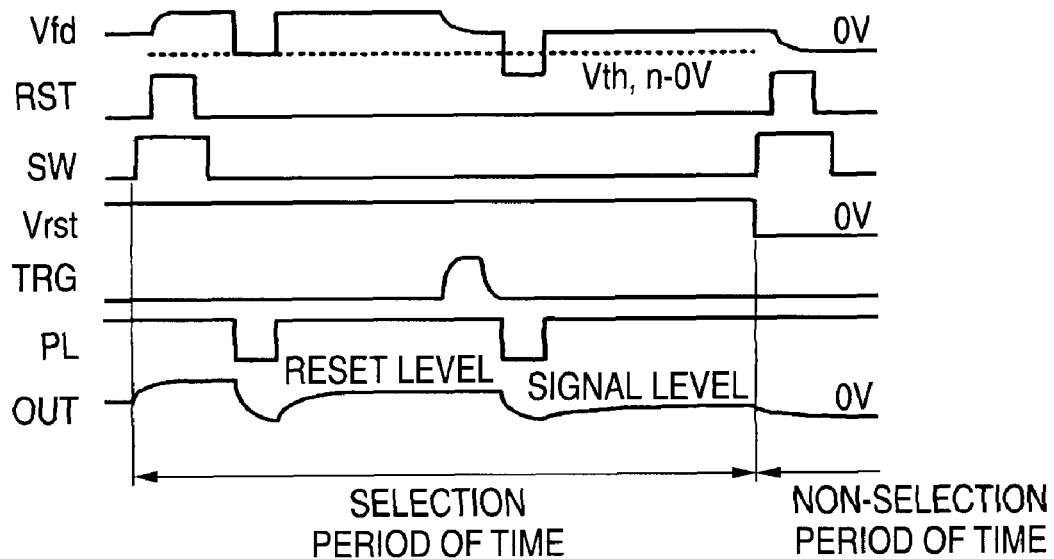
FIG. 10 is a timing chart used to explain a circuit operation of the unit pixel in the fourth circuit example.

FIG. 10 is a timing chart used to explain an operation of the unit pixel 20D. In FIG. 10, timing relationships among an electric potential Vfd of an FD section 27, a reset pulse RST, the switch pulse SW, the reset voltage Vrst, a transfer pulse TRG, a pulse signal PL, and an output signal OUT of the unit pixel 20D and signal waveforms thereof are shown.

Referring to FIG. 10, even in the unit pixel 20D in the fourth circuit example, a selection transistor for the pixel selection is not provided in the same manner as in the unit pixel 20C in the third circuit example, and accordingly, the reset voltage Vrst has two values. Thus, a period of time for which the reset voltage Vrst is in a high level, that is, the reset voltage Vrst is the reset voltage (for example, Vdd level) in the first circuit example is a selection period of time of the pixel 20D, and a period of time for which the reset voltage Vrst is in a low level (for example, a ground level) is a non-selection period of time of the pixel 20D.

In the unit pixel 20D, first, during the selection period of time, the reset voltage Vrst is set as a high level and then the switch pulse SW becomes active (changes to a high level), thereby turning on the switch transistor 28. Thus, the high-level reset voltage Vrst is applied to the vertical signal line 111. Then, the reset pulse RST becomes active, and consequently, the reset transistor 23 is in an ON state. As a result, the reset operation of the FD section 27 is performed and at the same time, the pixel 20D is automatically in a selection state.

Then, the switching pulse SW becomes inactive (changes to a low level), and consequently, the switch transistor 28 is in an OFF state. As a result, the supply of the reset voltage Vrst to the vertical signal line 111 is stopped, and then the electric potential of the FD section 27 after the reset operation is read out as a reset level to the vertical signal line 111. Then, the transfer pulse TRG becomes active (changes to a high level), and consequently, the signal charges accumulated in the photodiode 21 are transferred to the FD section 27 to be read out as a signal level.

After the selection period of time expires and thus the reset voltage Vrst transitions to a low level, the reset pulse RST becomes active again. As a result, since the amplifying transistor 24 is in an OFF state, the pixel 20D is in a non-selection state. Thus, a series of reading operations are completed.

Even in the unit pixel 20D in the fourth circuit example, by inputting the pulse signal PL to the other end of the capacitive element 26 once or a plural number of times after resetting the FD section 27 and transferring the signal charges, it is possible to cause the amplifying transistor 24 to be in an OFF state or a deep accumulation state immediately before reading out the reset level or the signal level. As a result, since it is possible to sweep out the electrons/holes trapped in the channel of the amplifying transistor 24, it is possible to reduce the 1/f noise of the amplifying transistor 24 at the time of reading out the reset level or the signal level.

Next, a specific circuit example of the column circuit 16 shown in FIG. 1 will be described.

First Circuit Example of a Column Circuit

Figure 11:
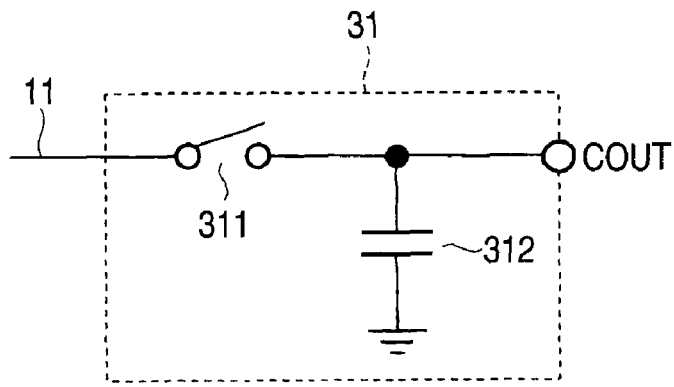
FIG. 11 is a circuit diagram illustrating an example of the configuration of a sample and hold circuit.

A column circuit 16 in a first circuit example is configured to include a sample and hold circuit. FIG. 11 is a circuit diagram illustrating an example of the configuration of a sample and hold circuit.

As shown in FIG. 11, a sample and hold circuit 31 in this example is configured to include a sampling switch 311, which has one end connected to one end of the vertical signal line 111 and is turned on/off by a sample and hold pulse SH, and a capacitive element 312 connected between the other end of the sampling switch 311 and a reference node (for example, a ground).

Figure 12:
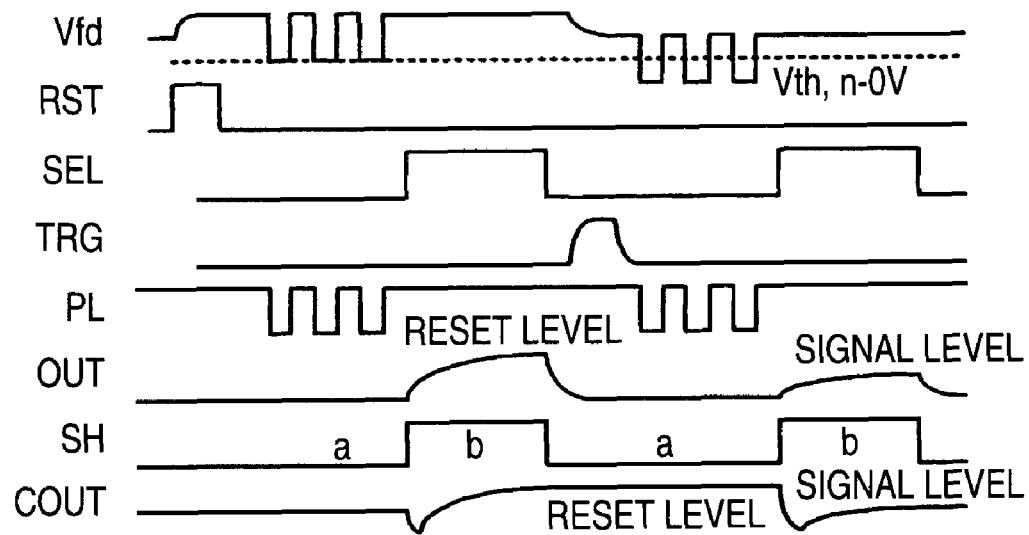
FIG. 12 is a timing chart used to explain a circuit operation of the sample and hold circuit.

FIG. 12 is a timing chart used to explain an operation of the sample and hold circuit 31. In FIG. 12, assuming that the unit pixel 20A in the first circuit example is used as the unit pixel 20 and the above-described second circuit operation is applied, timing relationships among the electric potential Vfd of the FD section 27, the reset pulse RST, the selection pulse SEL, the transfer pulse TRG, the pulse signal PL, and the output signal OUT of the unit pixel 20A, the sample and hold pulse SH, and an output signal COUT of the sample and hold circuit 31 and signal waveforms thereof are shown.

As shown in the timing chart of FIG. 12, in the case when the sample and hold circuit 31 is used as the column circuit 16, when the sample and hold pulse SH is inactive (in a low level) and thus the sample and hold circuit 31 is in a hold state a, the pulse signal PL is input to the other end of the capacitive element 26 a plural number of times (or once), and when the sample and hold pulse SH is active (in a high level) and the sample and hold circuit 31 is in a sample state b, a reset level or a signal level is read out.

As a result of the operation described above, the amplifying transistor 24 can be in an OFF state or a deep accumulation state immediately before reading out the reset level or the signal level. Accordingly, since the electrons/holes trapped in the channel of the amplifying transistor 24 can be swept out, it is possible to reduce 1/f noise of the amplifying transistor 24 or sample and hold the reset level or the signal level.

Second Circuit Example of a Column Circuit

Figure 13:
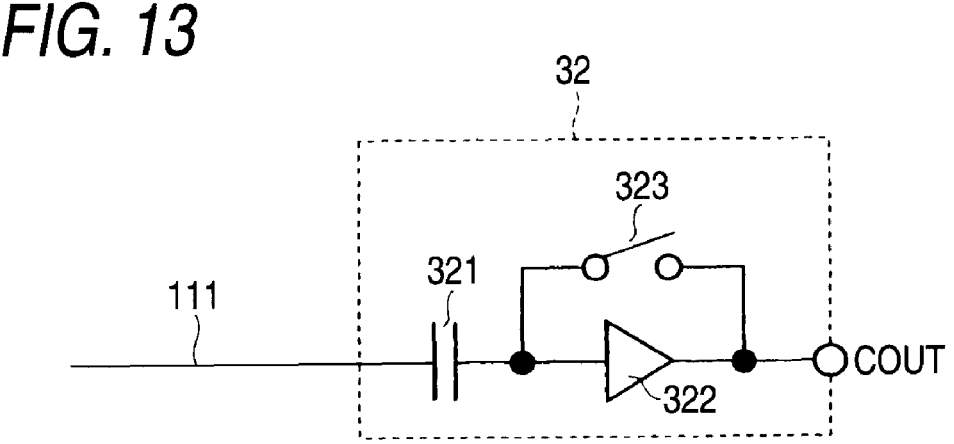
FIG. 13 is a circuit diagram illustrating an example of the configuration of a noise elimination circuit.

A column circuit 16 in a second circuit example is configured to include a noise elimination circuit having a sample and hold circuit. FIG. 13 is a circuit diagram illustrating an example of the configuration of a noise elimination circuit having a sample and hold circuit.

As shown in FIG. 13, a noise elimination circuit 32 in this example is configured to include a capacitive element 321 whose one end is connected to one end of the vertical signal line 111, an operational amplifier 322 whose input end is connected to the other end of the capacitive element 321, and a sampling switch 323 which is connected between input and output ends of the operational amplifier 322 and is turned on/off by the sample and hold pulse SH.

Figure 14:
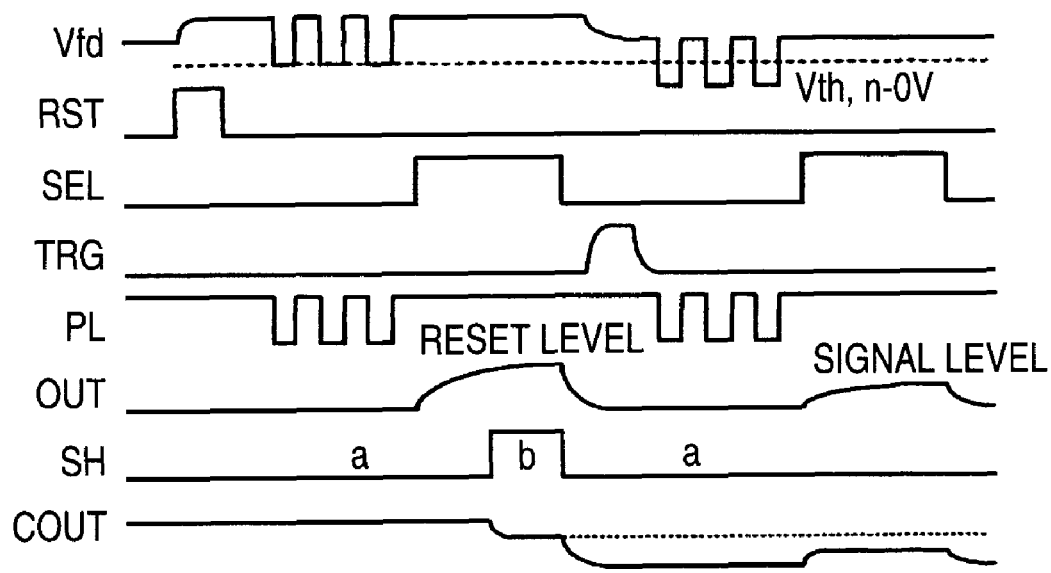
FIG. 14 is a timing chart used to explain a circuit operation of the noise elimination circuit.

FIG. 14 is a timing chart used to explain an operation of the noise elimination circuit 32. In FIG. 14, assuming that the unit pixel 20A in the first circuit example is used as the unit pixel 20 and the above-described second circuit operation is applied, timing relationships among the electric potential Vfd of the FD section 27, the reset pulse RST, the selection pulse SEL, the transfer pulse TRG, the pulse signal PL, and the output signal OUT of the unit pixel 20A, the sample and hold pulse SH, and an output signal COUT of the noise elimination circuit 32 and signal waveforms thereof are shown.

As shown in the timing chart of FIG. 14, in the case when the noise elimination circuit 32 having a sample and hold circuit is used as the column circuit 16, under a hold state a where the sample and hold pulse SH is inactive (in a low level), the pulse signal PL is input to the other end of the capacitive element 26 a plural number of times (or once). Consequently, the amplifying transistor 24 is in an OFF state or a deep accumulation state. Then, the selection pulse SEL becomes active. As a result, the pixel 20 is selected and thus a reset level is read out.

Then, acquisition of a reset level is performed in a sample state b where the sample and hold pulse SH is active (in a high level). Then, the sample and hold pulse SH becomes inactive again, and as a result, the acquired reset level is held.

Subsequently, the transfer pulse TRG becomes active, and consequently, signal charges are transferred from the photodiode 21 to the FD section 27. In this state, the pulse signal PL is input again to the other end of the capacitive element 26 a plural number of times (or once). Accordingly, the amplifying transistor 24 is in an OFF state or a deep accumulation state.

Then, the selection pulse SEL becomes active. As a result, the pixel 20 is selected and thus a signal level is read out.

By the series of operations described above, the reset level or signal level from which the 1/f noise of the amplifying transistor 24 has been reduced is input to the noise elimination circuit 32. In addition, the noise elimination circuit 32 performs a processing for obtaining a difference between a signal level including a reset level and the reset level held beforehand.

The processing for obtaining the difference is a processing called CDS (correlated double sampling). By this processing, it is possible to obtain, as the output signal COUT of the noise elimination circuit 32, a signal level from which a fixed pattern noise inherent in a pixel, such as a reset noise or a threshold value variation of the amplifying transistor 24, is eliminated.

Furthermore, in the embodiment described above, the case has been exemplified where the sample and hold circuit 31 or the noise elimination circuit 32 having a sample and hold circuit is used as the column circuit 16. However, the sample and hold circuit 31 or the noise elimination circuit 32 having a sample and hold circuit is only an example, and the invention is not limited thereto. For example, it may be possible to add an A/D (analog/digital) conversion function in the column circuit 16 so that the signal level can be output as a digital signal.

Second Embodiment

Figure 15:
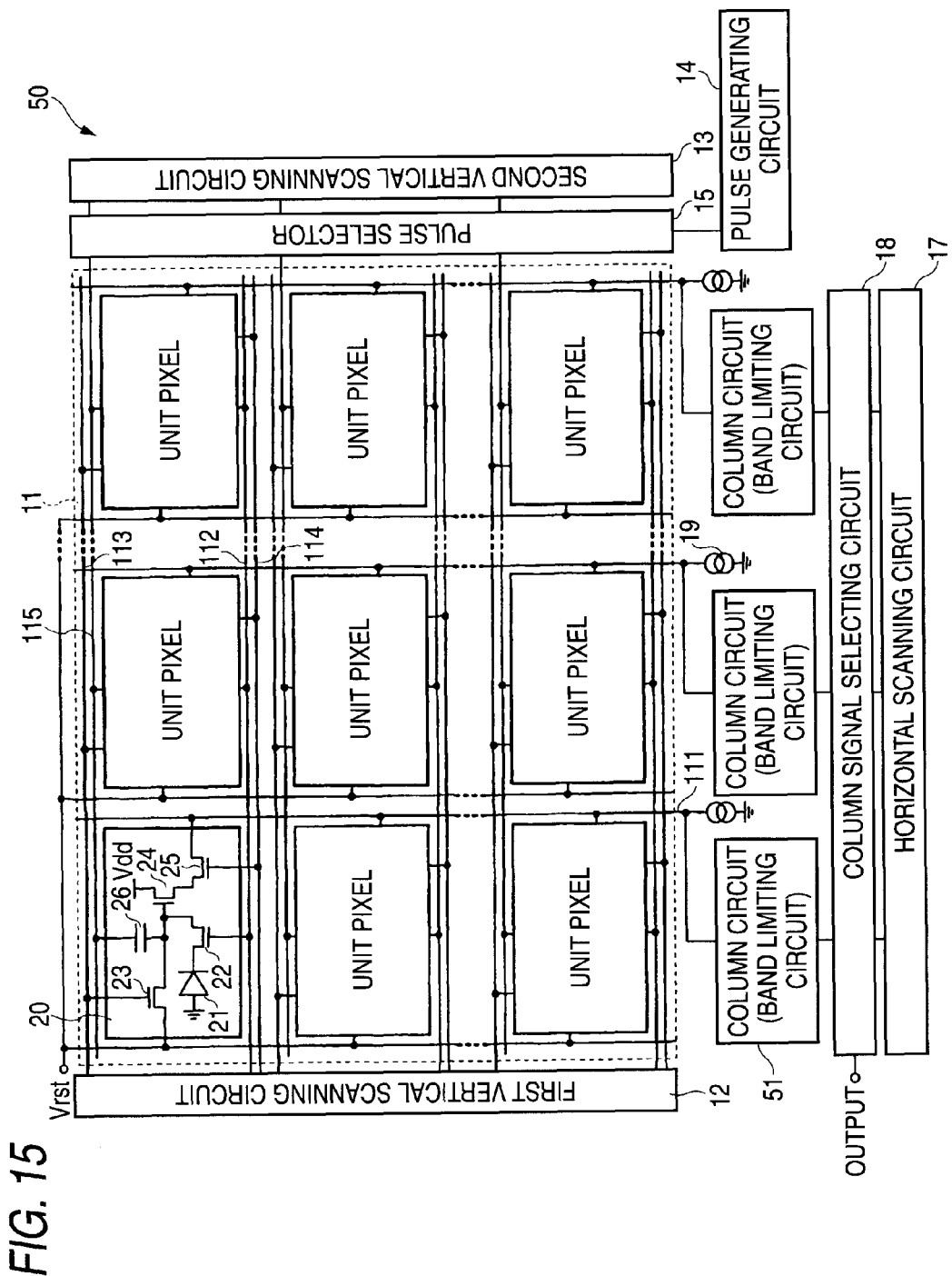
FIG. 15 is a system configuration view illustrating the configuration of a CMOS image sensor according to a second embodiment of the invention.

FIG. 15 is a system configuration view illustrating the configuration of a solid-state imaging device according to a second embodiment of the invention, for example, the configuration of a CMOS image sensor. In FIG. 15, the same elements as in FIG. 1 are denoted by the same reference numerals.

As shown in FIG. 15, a CMOS image sensor 50 according to the present embodiment is configured to include a pixel array unit 11, in which unit pixels 20 each having a photoelectric conversion element are arranged in a matrix and in a two-dimensional manner, a first vertical scanning circuit 12, a second vertical scanning circuit 13, a pulse generating circuit 14, a pulse selector 15, a plurality of column circuits 51, a horizontal scanning circuit 17, and a column signal selecting circuit 18, which are peripheral circuits of the pixel array unit 11.

As the unit pixel 20, any one of the unit pixels 20A, 20B, 20C, and 20D in the first to fourth circuit examples may be used, in the same manner as the CMOS image sensor 10 according to the first embodiment. The first vertical scanning circuit 12, the second vertical scanning circuit 13, the pulse generating circuit 14, the pulse selector 15, the horizontal scanning circuit 17, and the column signal selecting circuit 18 basically have the same configuration as the case of CMOS image sensor 10 according to the first embodiment.

The CMOS image sensor 50 according to the present embodiment is different from the CMOS image sensor 10 according to the first embodiment in that the CMOS image sensor 50 according to the second embodiment uses at least a band limiting circuit as the column circuit 51. In the present embodiment, a configuration is adopted in which the column circuit 51 includes a band limiting circuit and a sample and hold circuit.

First Circuit Example of a Column Circuit

Figure 16:
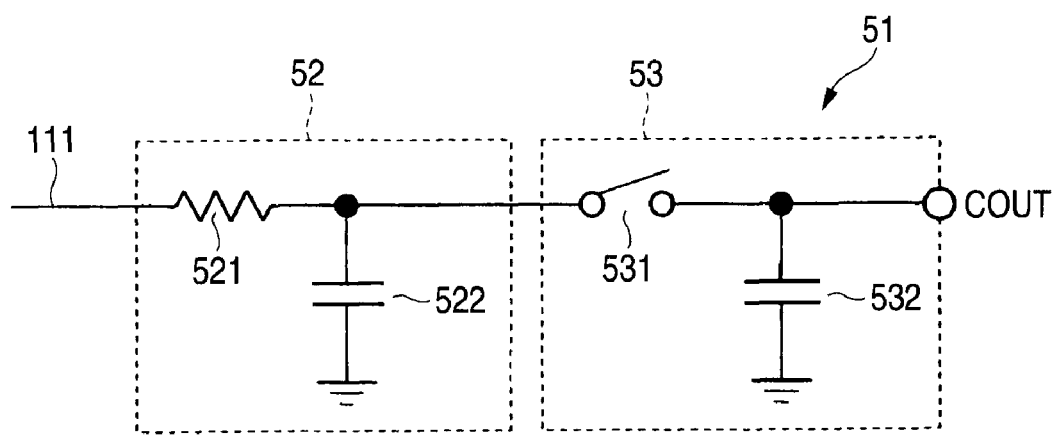
FIG. 16 is a circuit diagram illustrating an example of the configuration of a band limiting circuit and a sample and hold circuit.

The column circuit 51 in a first circuit example is configured to include a band limiting circuit and a sample and hold circuit. FIG. 16 is a circuit diagram illustrating an example of the configuration of a band limiting circuit and a sample and hold circuit.

Referring to FIG. 16, a band limiting circuit 52 is configured by using a low band pass filter which includes a resistive element 521 having one end connected to one end of the vertical signal line 111 and a capacitive element 522 connected between the other end of the resistive element 521 and a reference node (for example, a ground) and has a frequency characteristic of a predetermined cutoff frequency fc.

The sample and hold circuit 53 is configured to include a sampling switch 531, which has one end connected to an output end of the band limiting circuit 52 and is turned on/off by the sample and hold pulse SH, and a capacitive element 532 connected between the other end of the sampling switch 531 and a reference node (for example, a ground).

Second Circuit Example of a Column Circuit

Figure 17:
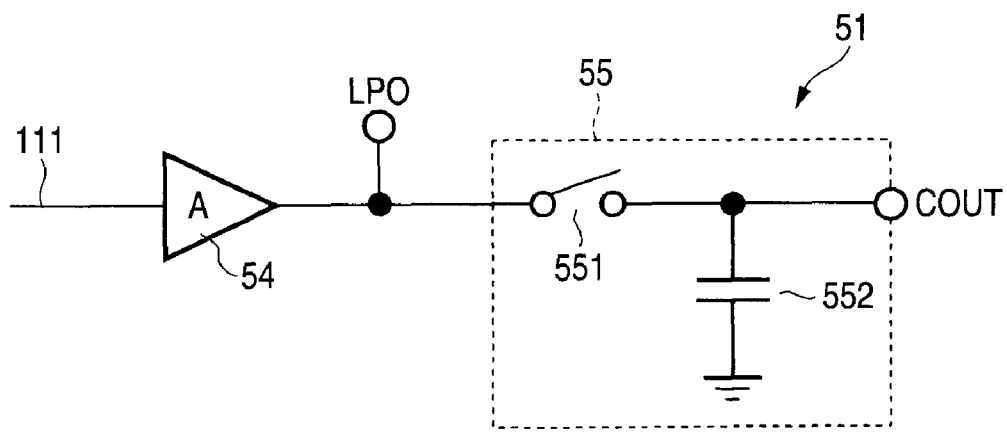
FIG. 17 is a circuit diagram illustrating an example of the configuration of a column amplifier and a sample and hold circuit.

A column circuit 51 in a second circuit example is configured to include a column amplifier and a sample and hold circuit. FIG. 17 is a circuit diagram illustrating an example of the configuration of a column amplifier and a sample and hold circuit.

Figure 18:
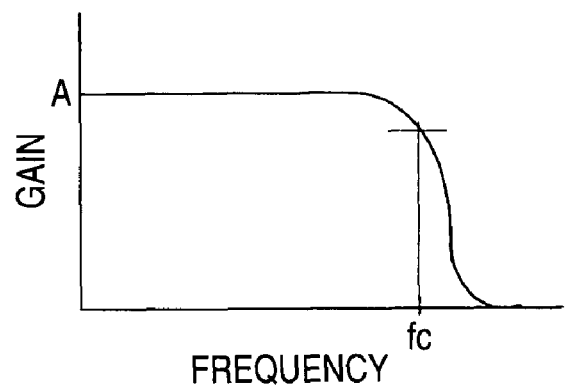
FIG. 18 is a view illustrating a frequency characteristic of the column amplifier.

Referring to FIG. 17, a column amplifier 54 has a function as a low band pass filter having a frequency characteristic shown in FIG. 18, that is, a predetermined cutoff frequency fc, and is configured such that an input end thereof is connected to one end of the vertical signal line 111. The sample and hold circuit 55 is configured to include a sampling switch 551, which has one end connected to an output end of the column amplifier 54 and is turned on/off by the sample and hold pulse SH, and a capacitive element 552 connected between the other end of the sampling switch 551 and a reference node (for example, a ground).

As described above, in the first or second circuit example, the column circuit having the above configuration, that is, the band limiting circuit, and more specifically, the column circuit having a function of a low band pass filter is used as the column circuit 51. Accordingly, even if a high-frequency pulse signal is superimposed on the reset level or signal level output from the unit pixel 20, a component corresponding to the pulse signal is cut off due to the function of the low band pass filter, so that the reset level or the signal level can be output as an average value (or, a peak value) by an averaging process.

Figure 19:
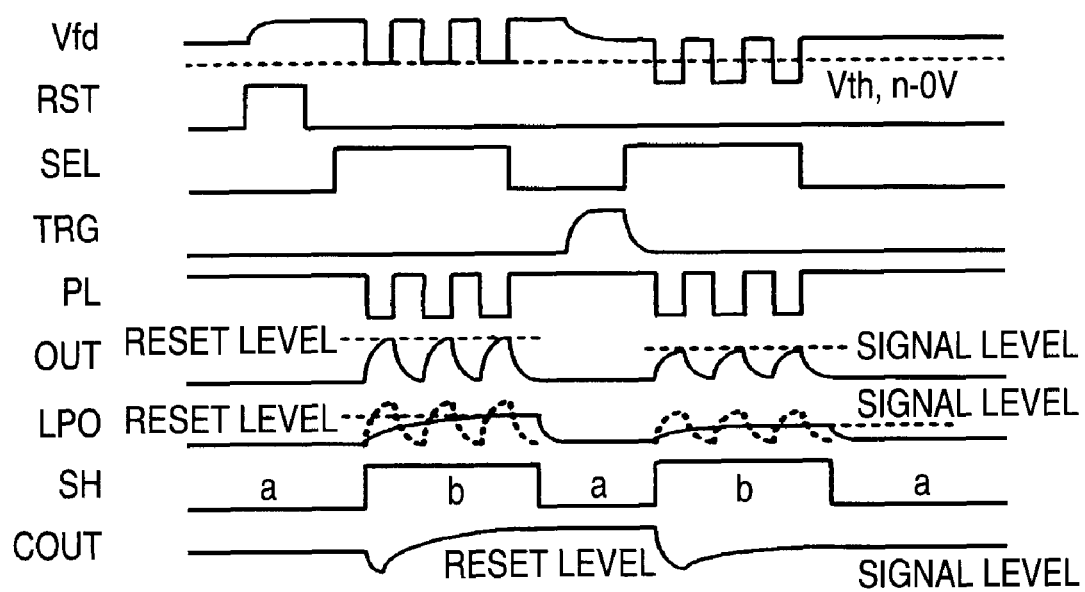
FIG. 19 is a timing chart used to explain an operation of a column circuit having a column amplifier and a sample and hold circuit.

FIG. 19 is a timing chart used to explain an operation of the column circuit 51 in the second circuit example, that is, an operation of the column circuit 51 having the column amplifier 54 and the sample and hold circuit 55.

In FIG. 19, assuming that the unit pixel 20A in the first circuit example is used as the unit pixel 20 and the above-described second circuit operation is applied, timing relationships among an electric potential Vfd of the FD section 27, a reset pulse RST, a selection pulse SEL, a transfer pulse TRG, a pulse signal PL, an output signal OUT of the unit pixel 20A, an output signal LPO of the column amplifier 54, a sample and hold pulse SH, and an output signal COUT of the sample and hold circuit 55 and signal waveforms thereof are shown.

Figure 20:
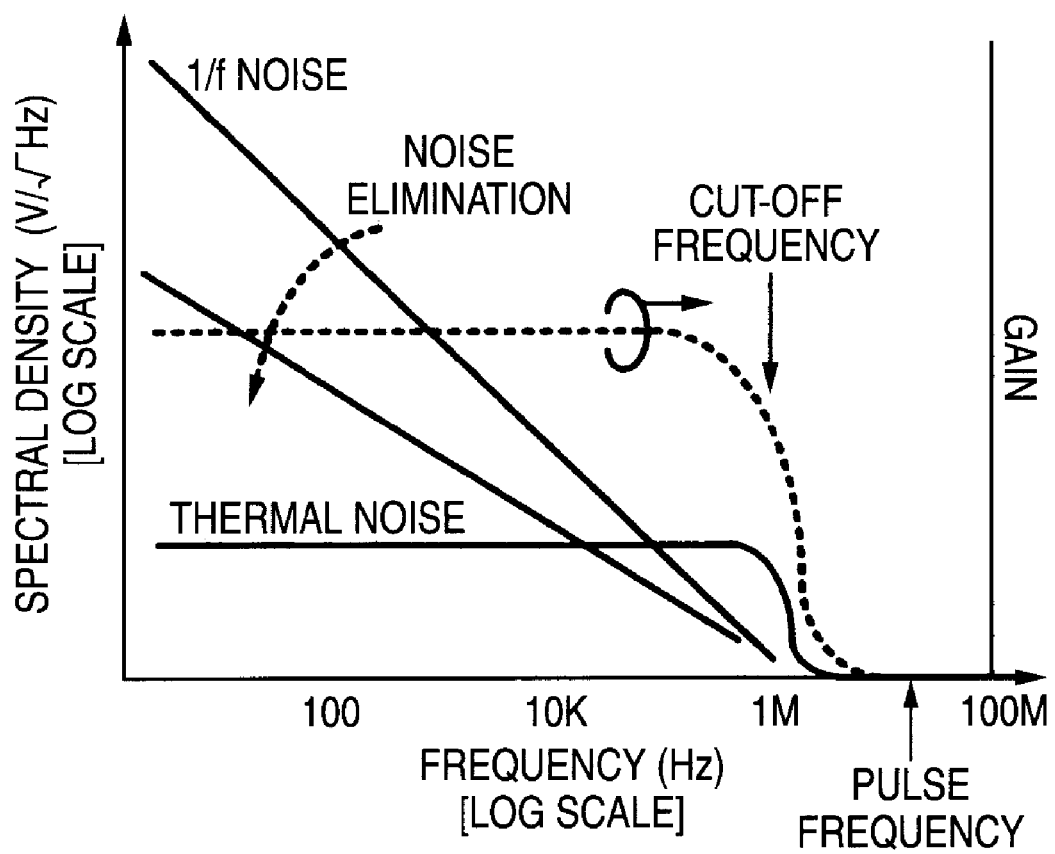
FIG. 20 is an explanatory view related to setting a frequency of a pulse signal PL.

In addition, as shown in FIG. 20, it is preferable to set, as a frequency of the pulse signal PL, a frequency sufficiently higher than the cutoff frequency fc of the band limiting circuit (low band pass filter) 52 in the first circuit example or the cutoff frequency fc of the column amplifier 54 in the second circuit example.

In the circuit operation of the column circuit 16 of the CMOS image sensor 10 according to the first embodiment, particularly when the pulse signal PL is input a plural number of times, the input operation is performed for the non-selection period of time of the unit pixel 20, that is, for a period of time while the selection pulse SEL is inactive, as is apparent from the timing charts shown in FIGS. 12 and 14 and the above description on the operations.

In contrast, in the CMOS image sensor 50 according to the present embodiment, as shown in the timing chart of FIG. 19, a configuration is adopted in which, during a selection period of time while the unit pixel 20 is selected by the selection pulse SEL, a reset level or a signal level is read out and at the same time, the pulse signal PL is input once or a plural number of times so as to be applied to the other end of the capacitive element 26 within the pixel 20.

Thus, even in the case of adopting the configuration in which the reset level or the signal level is read out and at the same time the pulse signal PL is input once or a plural number of times during the selection period of the unit pixel 20, it is possible to change the amplifying transistor 24 to the OFF state or the deep accumulation state by making the electric potential of the FD section 27 close to or less than the threshold voltage of the amplifying transistor 24 while holding the signal charges held in the FD section 27. As a result, it is possible to reduce 1/f noise of the amplifying transistor 24 at the time of reading out the reset level or the signal level.

Moreover, as is apparent from comparison of the timing charts shown in FIGS. 12 and 14 and the timing chart shown in FIG. 19, it is not necessary to specifically set a period of time to input the pulse signal PL while the pulse signal PL is to be input during the selection period of the unit pixel 20. As a result, a total reading period of time required for reading out a reset level and a signal level from the unit pixel 20 can be shortened. In addition, since a frequency of the pulse signal PL can be set to be high, it is possible to reduce the 1/f noise over a wide frequency range.

Modification

Figure 21:
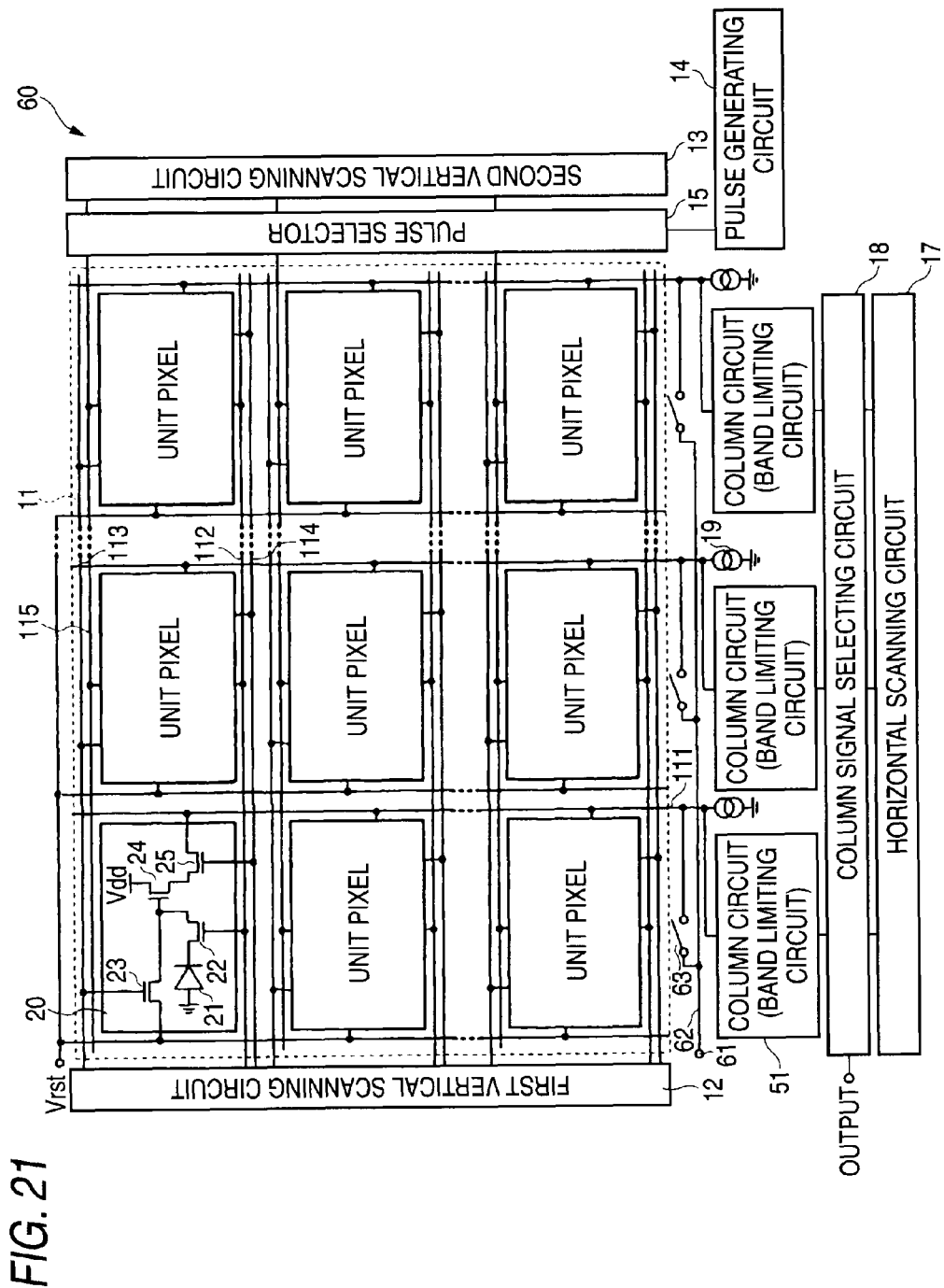
FIG. 21 is a system configuration view illustrating the configuration of a CMOS image sensor according to a modification of the second embodiment.

FIG. 21 is a system configuration view illustrating the configuration of a CMOS image sensor according to a modification of the second embodiment. In FIG. 21, the same elements as in FIG. 15 are denoted by the same reference numerals.

In the CMOS image sensor 50 according to the second embodiment, the configuration has been adopted in which the capacitive element 26 whose one end is connected to the FD section 27 is provided within the unit pixel 20, the amplifying transistor 24 changes to an OFF state or a deep accumulation state by applying the pulse signal PL to the other end of the capacitive element 26, and the column circuit having a band limiting circuit is used as the column circuit 51.

In contrast, in a CMOS image sensor 60 according to the modification, a configuration is adopted in which a switch 63 is provided between the vertical signal line 111 and a voltage supply line 62 to which a predetermined voltage is applied through a terminal 61, an electric potential of the vertical signal line 111 is set as a voltage of the voltage supply line 62 by turning on the switch 63, the amplifying transistor 24 changes to an OFF state or a deep accumulation state by applying the voltage to the source electrode of the amplifying transistor 24 through the selection transistor 25, and the column circuit having a band limiting circuit is used as the column circuit 51.

Since the CMOS image sensor 60 according to the modification does not have the configuration in which the capacitive element 26 whose one end is connected to the FD section 27 is provided within the unit pixel 20 and the pulse signal PL is applied to the other end of the capacitive element 26, it may not be possible to obtain effects due to adopting the configuration. However, it is possible to obtain effects due to adopting the configuration in which the column circuit having a band limiting circuit is used as the column circuit 51. In other words, even if a high-frequency pulse signal is superimposed on the reset level or signal level output from the unit pixel 20, a component corresponding to the pulse signal can be cut off due to the function of the low band pass filter so that the reset level or the signal level can be output. Thus, it is possible to shorten a period of time required for reading out a signal from the unit pixel 20.

In addition, in the embodiment, a column circuit having a band limiting circuit and a sample and hold circuit has been used as the column circuit 51; however, the invention is not limited thereto. For example, it may be possible to use a noise elimination circuit having a band limiting circuit and a sample and hold circuit as a column circuit. Alternatively, it may be possible to add an A/D conversion function in the column circuit 51 so that the signal level can be output as a digital signal.

Application Example

Each of the CMOS image sensors 10, 50, and 60 according to the embodiments described above is suitable for use as an imaging device (image input device) in an imaging apparatus, such as a digital still camera or a video camera.

Here, the imaging apparatus refers to a solid-state imaging device as an imaging device, a camera module (for example, the camera module is mounted in an electronic apparatus, such as a mobile phone) having an optical system causing image light from a photographic subject to be formed on an imaging surface (light-receiving surface) of the solid-state imaging device and a signal processing circuit of the solid-state imaging device, and a camera system such as a digital still camera or a video camera having the camera module mounted therein.

Figure 22:
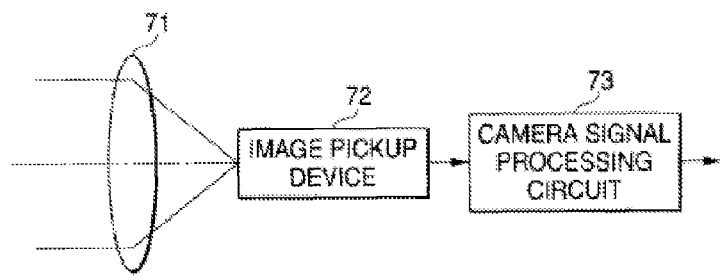
FIG. 22 is a block diagram illustrating an example of the configuration of an imaging apparatus according to another embodiment of the invention.
Figure 23:
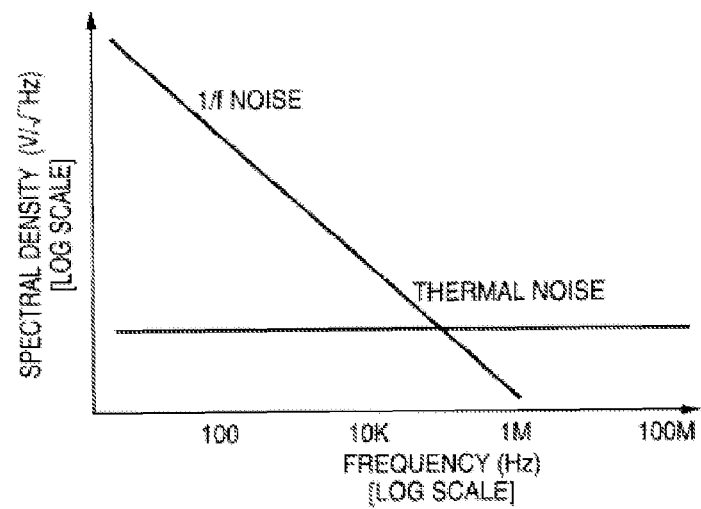
FIG. 23 is a view illustrating a frequency characteristic of current noise of a transistor.
Figure 24:
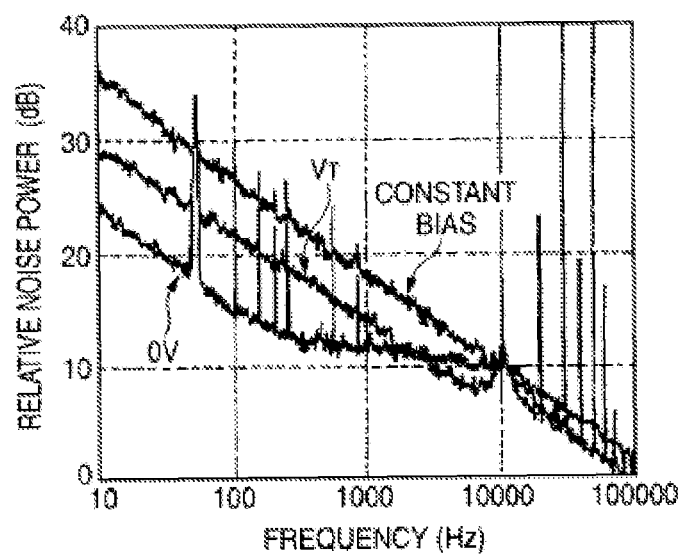
FIG. 24 is a view illustrating the frequency spectrum of relative noise power of 1/f noise in a case of applying a pulse signal with a frequency of 10 kHz and a duty cycle of 50%.
Figure 25:
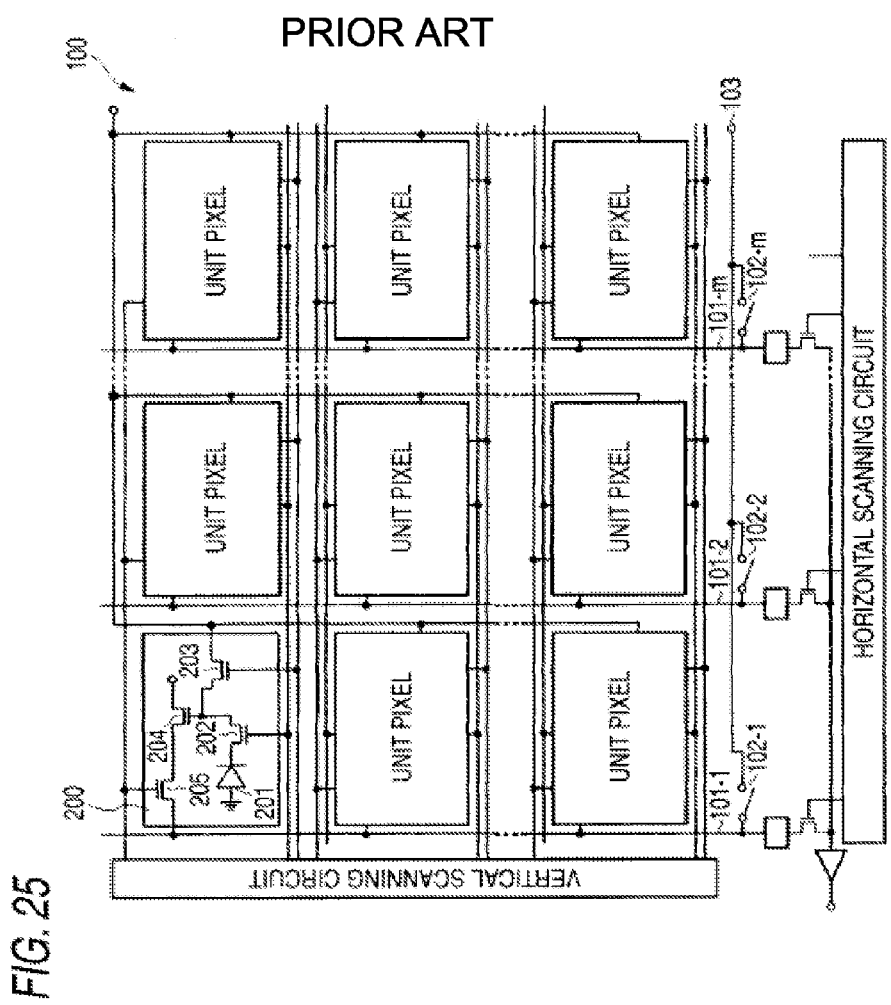
FIG. 25 is a system configuration view illustrating the configuration of a CMOS image sensor in the related art.

FIG. 22 is a block diagram illustrating an example of the configuration of an imaging apparatus according to another embodiment of the invention.

As shown in FIG. 22, the imaging apparatus according to another embodiment of the invention is configured to include an optical system having a lens 71, an imaging device 72, and a camera signal processing circuit 73.

The lens 71 serves to form image light from a photographic subject on the imaging surface of the imaging device 72. The imaging device 72 converts the image light, which has been formed on the imaging surface by the lens 71, into an electrical signal in a unit of a pixel and then outputs an obtained image signal. Each of the CMOS image sensors 10, 50, and 60 according to the embodiments described above is used as the imaging device 72. The camera signal processing circuit 73 performs various signal processing on the image signals output from the imaging device 72.

As described above, since each of the CMOS image sensors 10, 50, and 60 according to the embodiments is used as the imaging device 72 in an imaging apparatus, such as a video camera, an electronic still camera, or a camera module for a mobile apparatus such as a mobile phone, the following effects are obtained.

That is, in the CMOS image sensors 10, 50, and 60 according to the embodiments described above, it is possible to reduce the 1/f noise of an amplifying transistor within a unit pixel while reducing the power consumption and increasing the speed of a signal reading operation by reducing load when applying the pulse signal PL. As a result, it is possible to reduce the power consumption of the entire imaging apparatus and to increase the speed of an imaging operation, and it is possible to improve the image quality of a captured image.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   (a) a pixel array unit including unit pixels arranged in a matrix, each of the unit pixels having
      (1) a photoelectric conversion element that converts a light signal to a signal charge,
      (2) an amplifying transistor that amplifies and outputs the signal charge as a signal voltage, and
      (3) a capacitive element with one side connected to a control electrode of the amplifying transistor;
   (b) a driving unit configured to selectively supply a predetermined voltage to the capacitive element via a pulse supply line directly connected to the other side of the capacitive element; and
   (c) a signal processing circuit that performs a predetermined signal processing with respect to a signal output from each pixel of the pixel array unit,
   wherein,
      the driving unit repeatedly performs an operation that causes the amplifying transistor to be in an OFF state or a deep accumulation state once or a plural number of times for a period of time while the signal is being read out from the unit pixel by the driving unit.

2. The solid-state imaging device according to claim 1, wherein the signal processing circuit comprises (1) a sample and hold circuit, configured to sample and hold a signal output from the unit pixel through the amplifying transistor, or (2) a noise elimination circuit that includes the sample and hold circuit and eliminates a noise included in the signal output through the amplifying transistor.

3. The solid-state imaging device according to claim 2, wherein the driving means is configured to repeatedly supply the predetermined voltage to the other end of the capacitive element when the sample and hold circuit is in a hold state.

4. A solid-state imaging device comprising:
   a pixel array unit including unit pixels arranged in a matrix, each of the unit pixels having a photoelectric conversion element that converts a light signal to a signal charge, an amplifying transistor that amplifies and outputs the signal charge as a signal voltage, and a capacitive element with one side connected to a control electrode of the amplifying transistor;
   a driving unit configured to repeatedly perform an operation of causing the amplifying transistor to be in an OFF state or a deep accumulation state once or a plural number of times for a period of time while a signal is being read out from the unit pixel by the driving unit which selectively supplies a predetermined voltage to the other side of the capacitive element; and
   a band limiting circuit configured to perform a band limiting operation with respect to the signal output from the unit pixel through the amplifying transistor.

5. The solid-state imaging device according to claim 4, wherein:
   the unit pixel further includes a capacitive element with one side connected to a control electrode of the amplifying transistor, and
   the driving unit is configured to repeatedly supply a predetermined voltage to the other side of the capacitive element once or a plural number of times.

6. A method of driving a solid-state imaging device in which unit pixels are arranged in a matrix and each of the unit pixels has a photoelectric conversion element that converts a light signal to a signal charge, an amplifying transistor that amplifies and outputs the signal charge as a signal voltage, and a capacitive element with one side connected to a control electrode of the amplifying transistor, comprising the step of:
   repeatedly causing the amplifying transistor to be in an OFF state or a deep accumulation state by selectively supplying a predetermined voltage to the capacitive element via a pulse supply line directly connected to the other side of the capacitive element.

7. A method of driving a solid-state imaging device in which unit pixels are arranged in a matrix and each of the unit pixels has a photoelectric conversion element that converts a light signal to a signal charge, an amplifying transistor that amplifies and outputs the signal charge as a signal voltage, and a capacitive element with one side connected to a control electrode of the amplifying transistor, comprising the steps of:
   repeatedly performing an operation of causing the amplifying transistor to be in an OFF state or a deep accumulation state once or a plural number of times for a period of time while a signal is being read out from the unit pixel by a driving unit which selectively supplies a predetermined voltage to the capacitive element by a pulse supply line directly connected to the other side of the capacitive element; and
   performing a band limiting operation with respect to a signal output from the unit pixel through the amplifying transistor.

8. An imaging apparatus comprising:
   a solid-state imaging device in which unit pixels are arranged in a matrix and each of the unit pixels has a photoelectric conversion element that converts a light signal to a signal charge, an amplifying transistor that amplifies and outputs the signal charge as a signal voltage, and a capacitive element with one side connected to a control electrode of the amplifying transistor; and
   an optical system configured to guide light from a photographic subject onto an imaging surface of the solid-state imaging device,
   wherein,
      the solid-state imaging device includes
         (a) a driving unit configured to selectively supply a predetermined voltage to the capacitive element via a pulse supply line directly connected to the other side of the capacitive element; and
         (b) a signal processing circuit configured to perform a predetermined signal processing with respect to a signal output from each of the unit pixels,
      and wherein,
         the driving unit repeatedly performs an operation that causes the amplifying transistor to be in an OFF state or a deep accumulation state once or a plural number of times for a period of time while the signal is being read out from the unit pixel by the driving unit.

9. An imaging apparatus comprising:
   a solid-state imaging device in which unit pixels are arranged in a matrix and each of the unit pixels has a photoelectric conversion element that converts a light signal to a signal charge, an amplifying transistor that amplifies and outputs the signal charge as a signal voltage, and a capacitive element with one side connected to a control electrode of the amplifying transistor; and an optical system configured to guide light from a photographic subject onto an imaging surface of the solid-state imaging device,
wherein the solid-state imaging device includes
(a) a driving unit configured to repeatedly perform an operation of causing the amplifying transistor to be in an OFF state or a deep accumulation state once or a plural number of times for a period of time while a signal is being read out from the unit pixel by the driving unit which selectively supplies a predetermined voltage to the capacitive element via a pulse supply line directly connected to the other side of the capacitive element; and
(b) a band limiting circuit configured to perform a band limiting operation with respect to a signal output from the unit pixel through the amplifying transistor.

10. A solid-state imaging device comprising:
a pixel array unit including unit pixels arranged in a matrix, each of the unit pixels having a photoelectric conversion element that converts a light signal to a signal charge, an amplifying transistor that amplifies and outputs the signal charge as a signal voltage, and a capacitive element whose one end is connected to a control electrode of the amplifying transistor;
a driving section configured to selectively supply a predetermined voltage to the capacitive element via a pulse supply line directly connected to the other side of the capacitive element; and
a signal processing circuit configured to perform a predetermined signal processing with respect to a signal output from each pixel of the pixel array unit,
wherein,
the driving unit repeatedly performs an operation that causes the amplifying transistor to be in an OFF state or a deep accumulation state once or a plural number of times for a period of time while the signal is being read out from the unit pixel by the driving unit.

11. A solid-state imaging device comprising:
a pixel array unit including unit pixels arranged in a matrix, each of the unit pixels having a photoelectric conversion element that converts a light signal to a signal charge, an amplifying transistor that amplifies and outputs the signal charge as a signal voltage, and a capacitive element with one side connected to a control electrode of the amplifying transistor;
a driving section configured to repeatedly perform an operation of causing the amplifying transistor to be in an OFF state or a deep accumulation state once or a plural number of times for a period of time while a signal is being read out from the unit pixel by the driving unit which selectively supplies a predetermined voltage to the capacitive element via a pulse supply line directly connected to the other side of the capacitive element; and a band limiting circuit configured to perform a band limiting operation with respect to a signal output from the unit pixel through the amplifying transistor.

12. An imaging apparatus comprising:
a solid-state imaging device in which unit pixels are arranged in a matrix and each of the unit pixels has a photoelectric conversion element that converts a light signal to a signal charge, an amplifying transistor that amplifies and outputs the signal charge as a signal voltage, and a capacitive element with one side connected to a control electrode of the amplifying transistor; and
an optical system configured to guide light from a photographic subject onto an imaging surface of the solid-state imaging device,
wherein the solid-state imaging device includes
(a) a driving section configured to selectively supply a predetermined voltage to the capacitive element via a pulse supply line directly connected to the other side of the capacitive element; and
(b) a signal processing circuit configured to perform a predetermined signal processing with respect to a signal output from each of the unit pixels,
and wherein,
the driving unit repeatedly performs an operation that causes the amplifying transistor to be in an OFF state or a deep accumulation state once or a plural number of times for a period of time while the signal is being read out from the unit pixel by the driving unit.

13. An imaging apparatus comprising:
a solid-state imaging device in which unit pixels are arranged in a matrix and each of the unit pixels has a photoelectric conversion element that converts a light signal to a signal charge, an amplifying transistor that amplifies and outputs the signal charge as a signal voltage, and a capacitive element with one side connected to a control electrode of the amplifying transistor; and
an optical system configured to guide light from a photographic subject onto an imaging surface of the solid-state imaging device,
wherein the solid-state imaging device includes
a driving section configured to repeatedly perform an operation of causing the amplifying transistor to be in an OFF state or a deep accumulation state once or a plural number of times for a period of time while a signal is being read out from the unit pixel by the driving section which selectively supplies a predetermined voltage to the capacitive element via a pulse supply line directly connected to the other side of the capacitive element; and
a band limiting circuit configured to perform a band limiting operation with respect to a signal output from the unit pixel through the amplifying transistor.

* * * * *